US006876756B1

(12) United States Patent
Vieweg

(10) Patent No.: US 6,876,756 B1
(45) Date of Patent: Apr. 5, 2005

(54) CONTAINER SECURITY SYSTEM

(76) Inventor: Thomas Vieweg, 777 Mount Ave., Wyandanch, NY (US) 11798

( * ) Notice: Subject to any disclaimer, the term of this patent is extended or adjusted under 35 U.S.C. 154(b) by 0 days.

(21) Appl. No.: 09/992,261

(22) Filed: Nov. 18, 2001

Related U.S. Application Data

(63) Continuation-in-part of application No. 09/298,026, filed on Apr. 22, 1999, now Pat. No. 6,320,975.

(51) Int. Cl.[7] .................................................. G06K 9/00

(52) U.S. Cl. ....................... 382/124; 382/100; 226/238; 70/266; 361/206; 361/732

(58) Field of Search ................................ 382/100, 115, 382/126, 124; 206/317; 224/192, 193, 244, 243, 238; 211/4, 68, 8; 42/70.11; 70/63, 278.1, 229.1, 266; 361/172, 206, 600, 732, 801; 340/5.35, 5.73, 568.1, 562, 5.7

(56) References Cited

U.S. PATENT DOCUMENTS 4,768,021 A * 8/1988 Ferraro .................... 340/568.1
5,416,472 A * 5/1995 Torii, Jr. .................... 340/5.33
5,598,151 A * 1/1997 Torii, Jr. .................... 340/5.33
5,812,252 A * 9/1998 Bowker et al. ............... 356/71
5,916,087 A * 6/1999 Owens ....................... 224/243
5,978,495 A * 11/1999 Thomopoulos et al. ..... 382/124
6,260,300 B1 * 7/2001 Klebes et al. ............. 42/70.11

* cited by examiner

*Primary Examiner*—Bhavesh M. Mehta
*Assistant Examiner*—Sheela Chawan
(74) *Attorney, Agent, or Firm*—Edward P. Dutkiewicz

(57) ABSTRACT

A container security system comprising a container with a first section and a second section; a touch pad for fingerprint identification attached to the outside of the first section; a sensor with at least one pre-stored fingerprint operatively coupled to the touch pad; a solenoid coupled to the sensor and having a plunger reciprocable from a rest position to a withdrawn position in response to a signal from the sensor; a latch attached to the remote end of the plunger having a recess therein; and a release assembly coupled to the second section with a finger removably positionable in the recess to maintain the container locked in a closed orientation but with the finger being readily removable from the recess to allow the container to assume an open orientation when the latch and plunger are reciprocated in response to a fingerprint of a user on the touch pad matching a pre-stored fingerprint in the sensor.

9 Claims, 8 Drawing Sheets

FIG 5
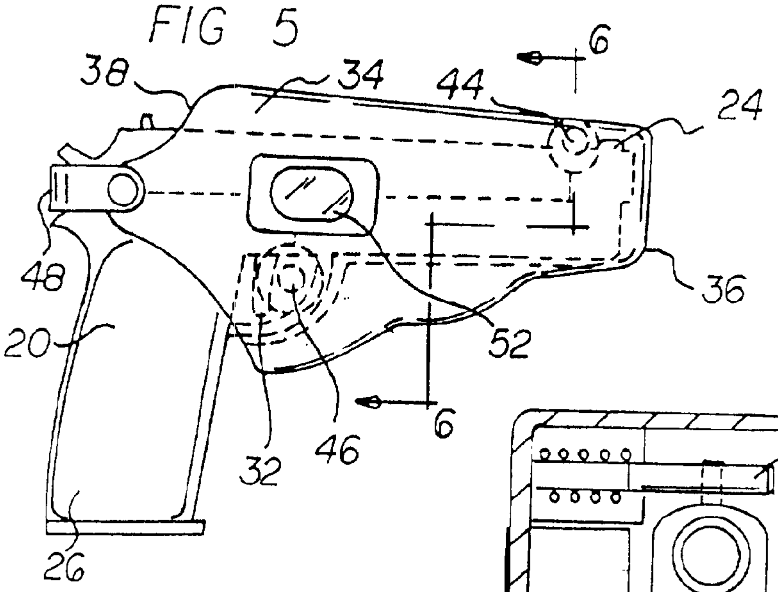
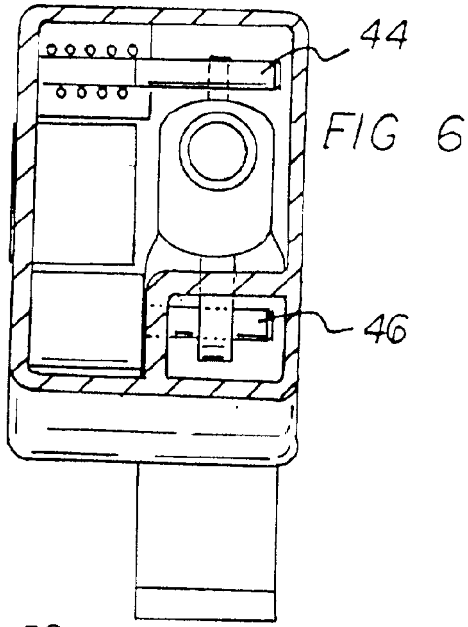
FIG 6
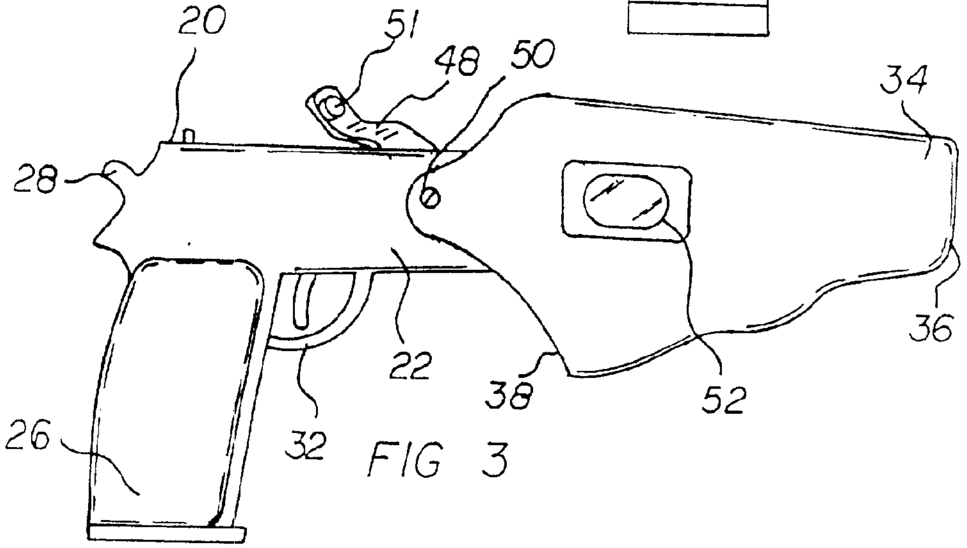
FIG 3

FIG 4
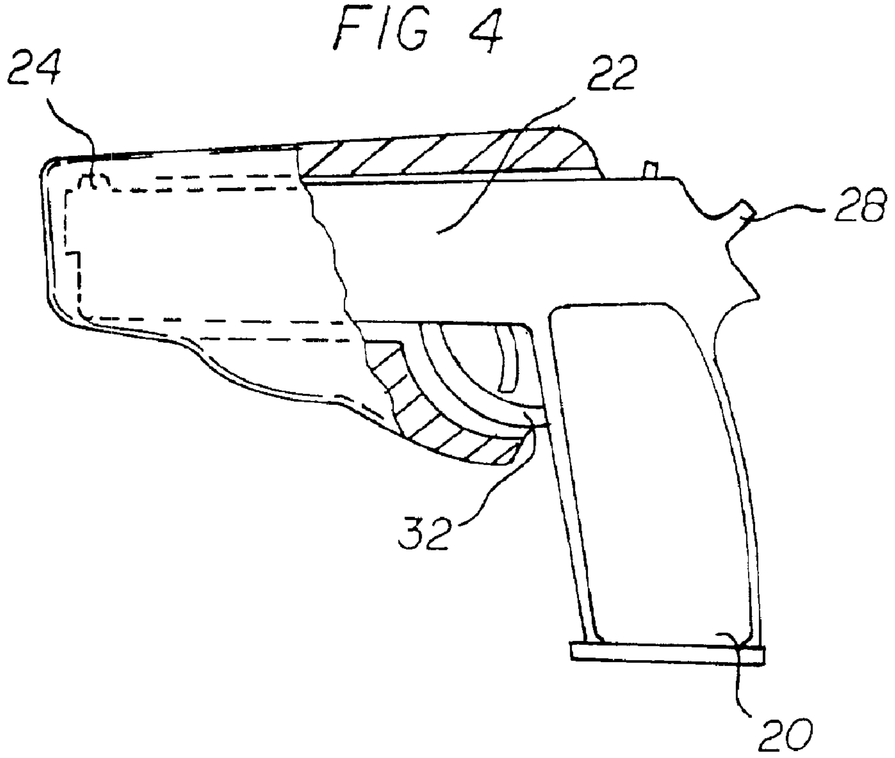
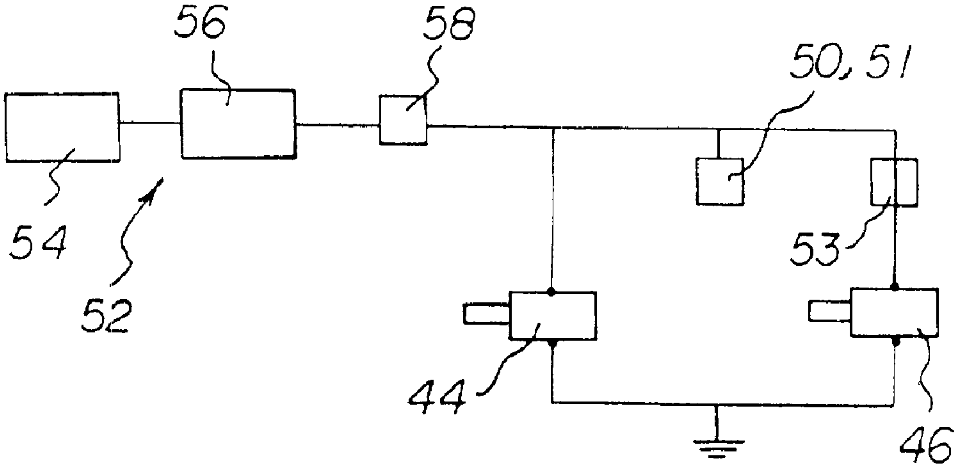
FIG 8

CONTAINER SECURITY SYSTEM

RELATED APPLICATION

This application is a continuation-in-part of U.S. application Ser. No. 09/298,026, filed Apr. 22, 1999 now U.S. Pat. No. 6,320,975.

BACKGROUND OF THE INVENTION

1. Field of the Invention

The present invention relates to lockable firearm holsters, and more particularly to maintaining a container locked until the presentation of a fingerprint of an approved user.

2. Description of the Prior Art

The use of weapon holsters and other containers such as purse, suitcases, attache cases and the like, is known in the prior art. By way of example, U.S. Pat. No. 3,419,728 to Wilson discloses a weapon holster which employs solenoids. U.S. Pat. No. 5,284,281 to Nichols discloses a holster with trigger guard gripping device. U.S. Pat. No. 5,322,200 to Blanchard discloses a storage holster for locking a handgun in place and preventing access to the handgun by unauthorized persons. U.S. Pat. No. 5,501,380 to Wu discloses a safety holster for receiving the barrel and receiver portion of a handgun. U.S. Pat. No. 5,518,155 to Gallagher discloses a holster lock for simultaneously contacting the trigger guard and muzzle of a handgun in a holster. U.S. Pat. No. 5,611,471 to French discloses a gun holster having a main frame formed from two flattened C-shaped pieces. Lastly, U.S. Pat. No. 5,779,114 to Owens discloses a safety device for a firearm having a first signal means for generating a first status signal reflecting the status of the receptacle as to whether the firearm is engaged or disengaged within the receptacle.

In this respect, the container security system with identification means according to the present invention substantially departs from the conventional concepts and designs of the prior art, and in doing so provides an apparatus primarily developed for the purpose of insuring that only authorized individuals have access to a firearm.

Therefore, it can be appreciated that there exists a continuing need for a new and improved container security system with identification means which can be used for insuring that only authorized individuals have access to the contents of the container. In this regard, the present invention substantially fulfills this need.

SUMMARY OF THE INVENTION

In view of the foregoing disadvantages inherent in the known types of container security system now present in the prior art, the present invention provides a new and improved container security system with identification means.

To attain this, the present invention essentially comprises a container security system for maintaining a container security system locked until the presentation of a fingerprint of an approved user. The system comprises, in combination, a container with a first section and a second section, the sections movable between a closed orientation for the secure maintenance of objects there within and an open orientation for adding and removing objects therefrom, each section having an inside and an outside. A touch pad is next provided for fingerprint identification attached to the outside of the first section adapted to removably receive a fingerprint of a user. A sensor is next provided with at least one pre-stored fingerprint on the inside of the first portion. It is operatively coupled to the touch pad and adapted to generate a signal when a fingerprint of the user on the touch pad matches a pre-stored fingerprint in the sensor. Next provided is a solenoid on the inside of the first section operatively coupled to the sensor. The solenoid has a plunger reciprocable from a rest position to a withdrawn position in response to a signal from the sensor so long as a fingerprint of a user is on the touch pad which matches a pre-stored fingerprint in the sensor. The plunger has a remote end. A latch is on the inside of the first section attached to the remote end of the plunger for reciprocation there with. The latch having a recess therein facing the first section and an aperture in the first section aligned with the recess. A release assembly is for coupling purposes and is attached to the second section. The release assembly having an exterior region on the outside of the second section and a finger extending inwardly of the inside of the second section through the aperture with an enlarged end removably positionable in the recess of the latch. The finger is securely retained within the recess of the latch to maintain the container locked in the closed orientation when the latch and solenoid are in the rest position. The finger is, however, readily removable from the recess and latch to allow the container security system to assume the open orientation when the latch and plunger are reciprocated to the withdrawn position in response to a fingerprint of a user on the touch pad matching a pre-stored finger print in the sensor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a system which securely retains objects within a container.

It is another object of the present invention to provide a container which can retain objects in a secure orientation.

It is a further object of the present invention to provide a container which allows only authorized users to have working access to the contents of the container.

Even still another object of the present invention is to create a system whereby the physical characteristics of a person desiring to open the container are verified against a stored data table to insure that only authorized users can access the contents.

Lastly, it is an object of the present invention to provide a container security system comprising a container with a first section and a second section; a touch pad for fingerprint identification attached to the outside of the first section; a sensor with at least one pre-stored fingerprint operatively coupled to the touch pad; a solenoid coupled to the sensor and having a plunger reciprocable from a rest position to a withdrawn position in response to a signal from the sensor; a latch attached to the remote end of the plunger having a recess therein; and a release assembly coupled to the second section with a finger removably positionable in the recess to maintain the container locked in a closed orientation but with the finger being readily removable from the recess to allow the container to assume an open orientation when the latch and plunger are reciprocated in response to a fingerprint of a user on the touch pad matching a pre-stored finger print in the sensor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a elevational view of a gun partially positioned within the holster.

FIG. 4 is a partial sectional view of a gun positioned within the holster.

FIG. 5 is a view of the firearm positioned within the holster, with the retaining means illustrated in phantom.

FIG. 6 is a cross-sectional view taken along line 4—4 of FIG. 5.

FIG. 8 is a schematic diagram depicting the fingerprint identification system of the secondary embodiment.

The same reference numerals refer to the same parts throughout the various Figures.

DESCRIPTION OF THE PREFERRED EMBODIMENT

Figure 1:
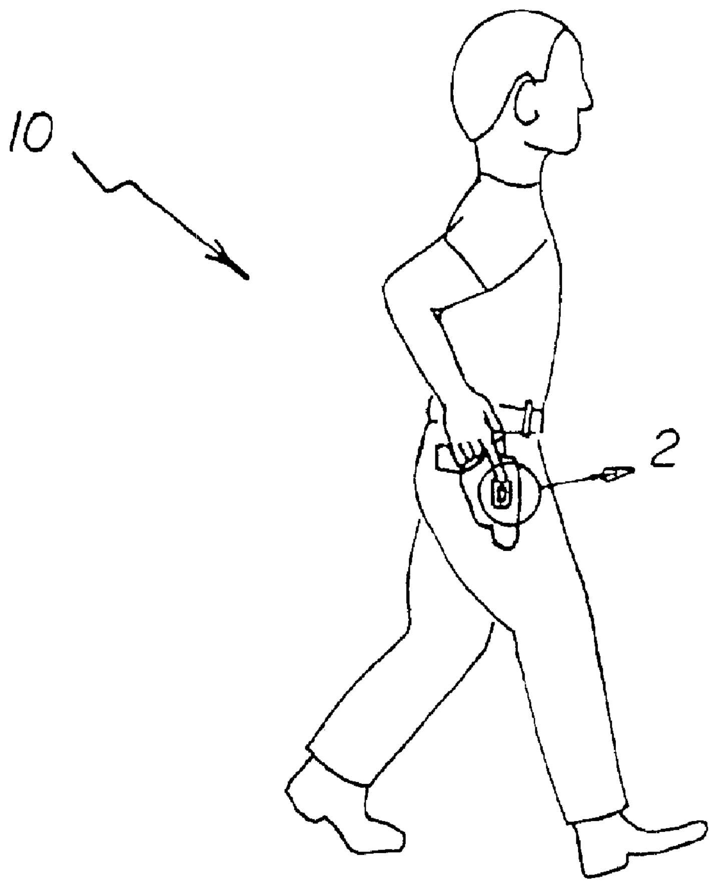
FIG. 1 is a perspective illustration of the preferred embodiment of the holster in use upon a user's waist.

With reference now to the drawings, the preferred embodiment of the new and improved container security system is described.

Generally, the device of the present invention includes a holster which is adapted to receive the forward, or barrel, portion of a hand held firearm. Additionally, the device includes locking means which function to selectively secure the firearm within the holster to prevent a user from using the firearm. Furthermore, the device includes a fingerprint identification system which is positioned upon an exterior surface of the holster. The fingerprint identification device enables a select user, or select group of users, to be able to remove the gun from the holster. The details of the present invention will be described in greater detail hereinafter.

The present invention is specifically for use in conjunction with a pistol 20, either an automatic pistol or a revolver. Any firearm employed with the device should include, in general terms, a barrel 22, a barrel sight 24, a grip 26, a hammer 28 and a trigger guard 32. Turning now to FIGS. 3 and 4, the holster 34 of the present invention is depicted. Such holster 34 is defined by a closed forward portion 36, an open rearward portion 38, as well as a periphery. In the preferred embodiment, this holster 34 is formed from a rigid but lightweight material. With reference now to FIG. 4, the internal guide channel 42 of the holster is depicted. This guide channel 42 is positioned along the interior length of the holster 34 and functions to appropriately orient a firearm upon insertion into the holster 34. Specifically, the guide channel 42 supports the barrel portion 22 of the firearm. The holster 34 is such that when the firearm is completely inserted within the interior of the holster 34, both the complete length of the barrel 22 and the trigger guard 32 are enclosed. The details of the firearm retaining means will be described in greater detail hereinafter.

The Firearm Retaining Means

An important feature of the present invention is the firearm retaining means which enables a user to secure the firearm within the interior of the holster 34, thereby making it unusable. In general, the firearm retaining means has a first orientation for securing the firearm within the holster and a second orientation which allows the firearm to be removed therefrom. Furthermore, the retaining means is in electrical communication with, and responsive to, a signal generating means. Such signal generating means operates to allow a user to selectively secure the firearm within the holster or allow it to be removed therefrom. In the preferred embodiment, the retaining means takes the form of a reinforced strap which is mechanically secured to the holster. In the preferred embodiment, the strap is steel reinforced. The reinforcement, however, can be achieved through other materials such as KEVLAR™.

The strap retaining means is depicted in FIG. 3. This Figure depicts the hammer strap 48 which can be engaged about the hammer 28 of a firearm and secured to the holster 34. With continuing reference to FIG. 3, the proximate end of the strap, which is secured to the open rearward portion 38 of the holster 34, and the distal end are depicted. The distal end of the strap includes a mechanical fastening lock 51. Additionally, the external surface of the holster includes a mechanical fastening lock 50. More specifically, the fastening lock 50 is positioned upon the external surface of the holster 34 adjacent the opened end 38. The fastening means 50 and 51 can take a variety of forms which are well known in the art. In the preferred embodiment, the lock 51 takes the form of a female slot. Additionally, the lock 50 takes the form of a retractable pin. Thus, the pin of lock 50 is dimensioned to be received within the female slot. With the pin extended through the female slot the locks 50 and 51 securely fastened to one another. In this orientation, the hammer strap 48 is securely fastened about the hammer 28 of the firearm, note FIG. 5.

Furthermore, the preferred embodiment also contemplates that the locks 50 and 51 carry electromagnets which are responsive to the supply of an electric current. More specifically, when locks 50 and 51 are coupled to a supply of electrical power, repulsive magnetic fields are generated. Thus, in operation, when the retractable pin of lock 50 is retracted the hammer strap is unlocked but not uncoupled. Thereafter, electrical power supplied to each of the locks 50 and 51 causes magnetic fields of opposing polarity to be generated. These repulsive magnetic fields cause the locks to become uncoupled. In this manner, when the locks are securely fastened to one another, a loss of electrical power will not cause the locks to become uncoupled. Thus, a firearm will remain secure within the holster in the event of power loss.

The electrical power necessary to power and activate both the retractable pin of lock 50 and the electromagnets can be supplied from a power source contained within the holster. Additionally, the fingerprint identification device 52 functions to control the operation of the retractable pin of lock 50 and the supply of electricity to the electromagnets. The manner in which the finger print identification device 52 achieves this will be described in greater detail hereinafter.

The specifics of the fingerprint identification device will be described in greater detail hereinafter. The retractable pin is powered and controlled in a manner which will be described in greater detail hereinafter.

In an alternative embodiment, two solenoid-activated plungers 44 and 46 are added to the retaining means. More specifically, a first solenoid-activated plunger 44 is secured upon the internal surface of the holster 34 approximate to the closed forward portion 36, note FIG. 5. In like fashion, a second solenoid-activated plunger 46 is secured upon the internal surface approximate the open rearward portion 38. Each of these plungers 44 and 46 has a first engaged orientation and a second disengaged orientation. Namely, with the solenoid in a first state, the plunger is expelled from the solenoid housing to extend across the entire width of the holster 34. Alternatively, when the solenoid is placed in a second state, the respective plunger is retracted into a solenoid housing to thereby create a free path through a length of a portion of the holster 34. The manner in which these various plungers engage a firearm which is positioned within the holster 34 will be described in greater detail hereinafter. The power source needed for each of the solenoids can be positioned within the holster.

The Fingerprint Identification Means

Each of the retaining means heretofore described—the hammer strap 48, the first solenoid-activated plunger 44 and the second solenoid-activated plunger 46—is adapted to be controlled by a secure user interface. In the preferred embodiment, this user interface takes the form of a fingerprint identification means 52. The fingerprint identification means 52 includes a fingerprint input device 54 which is positioned upon the external surface of the holster 34 at an intermediate extent. Furthermore, the identification means 52 includes a comparison means 56 for comparing a fingerprint inputted with electrically stored fingerprint images or data. If a match is made a first signal is generated by a signal generating means 58. Alternatively, if the inputted fingerprint does not match a stored value, the generating means 58 generates a second signal. The input device, comparison means, and signal generating means are all in electrical communication with one another. Details concerning the identification means 52 of both the primary and secondary embodiment are outlined below.

Figure 2:
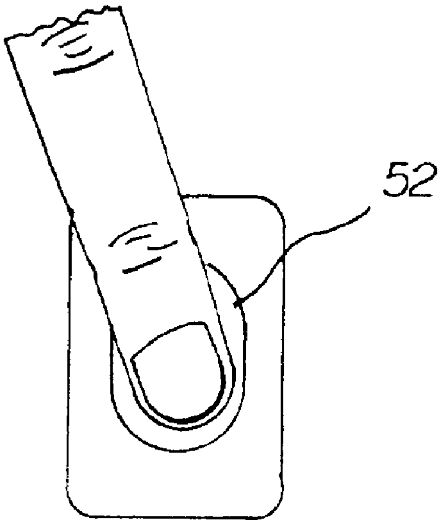
FIG. 2 is a detailed view taken from FIG. 1.
Figure 7:
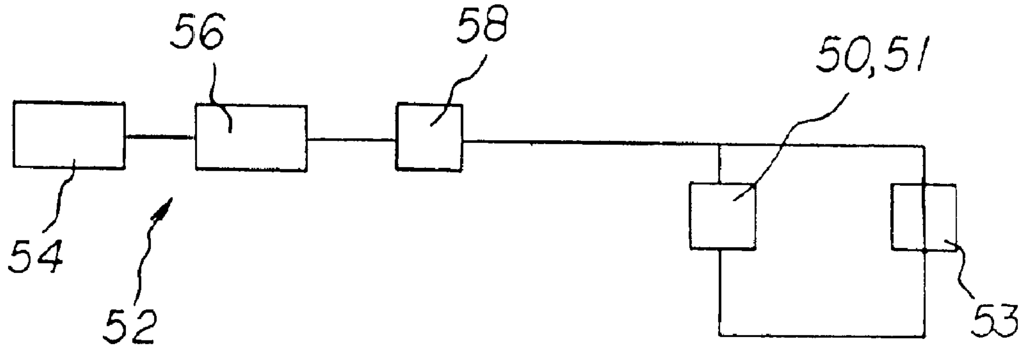
FIG. 7 is a schematic diagram depicting the fingerprint identification system of the primary embodiment.

FIG. 7 is a schematic illustrating the fingerprint identification means 52 as used in conjunction with the primary embodiment. This embodiment includes a fingerprint input device 54, a comparison means 56, a signal generating means 58, and locks 50/51 and an alarm 53. A user accesses the identification means by placing his or her finger upon the input device 54, note FIG. 2. Thereafter, the input device 54 scans the user's fingerprint. Finally, this image is converted into digital format and passed to the comparison means 56 wherein the fingerprint data is compared with a table of stored fingerprint data. As many fingerprints as desired can be stored in this data table. The fingerprint identification means also includes a signal generating means 58 which is in electrical communication with, and controls, the locks 50, 51 and alarm 53, as well as their power supplies. As noted previously, when the inputted fingerprint data matches one of the images stored, a first signal is generated. Conversely, when the inputted fingerprint data fails to correspond with any of the data stored within the comparison means, a second signal is generated. When an inputted fingerprint causes the generation of a first signal, the retractable pin of lock 50 is extended into the female slot of lock 51. In this configuration, the locks are securely fastened to one another and cannot be unlocked until an authorized finger print is inputted. Namely, with the locks 50 and 51 securely fastened to one another, inputting an authorized fingerprint again causes the generation of the first signal. When the first signal is generated for the second time the pin of lock 50 is retracted and electrical power is supplied to each of the locks to generate opposing and repulsive magnetic fields. These fields causes the locks 50 and 51 to become uncoupled in a manner described more fully hereinabove.

When the second signal is generated an alarm 53 is activated. The alarm can take the form of light or sound generating means. The alarm preferably stays activated until deactivated by inputting an authorized user's fingerprint. Through the use of the second signal and the alarm 53 an authorized user can readily determine if an unauthorized user has attempted to access the firearm.

Turning now to FIG. 8, the fingerprint identification means 52 is illustrated in conjunction with the secondary embodiment. In this embodiment, the signal generating means 58 is in electrical communication with the first and second solenoid-activated plungers 44 and 46, the first and second locks 50 and 51, the alarm 53, as well as the power supplies for these devices. The signal generating means 58 functions such that when a second signal is inputted the alarm is activated and remains activated until an authorized fingerprint is inputted. Furthermore, when the first signal is generated, the first and second solenoid-activated plungers are retracted to their second disengaged orientations and the first and second locks are uncoupled. In this orientation, the firearm can be removed from the holster 34. Alternatively, when the first signal is again generated, the first and second solenoid-activated plungers 44 and 46 are extended to their first engaged orientations and the first and second magnetic locks 50 and 51 are activated to allow for coupling in a manner described hereinabove.

In this manner, any firearm placed within the holster can be locked therein. Such an orientation is more clearly illustrated with reference to FIG. 6. FIG. 6 illustrates that when a firearm is placed within the interior of the holster, the first solenoid-activated plunger 44 is positioned to selectively engage the barrel sight 24 and the second plunger 46 is adapted to engage the trigger guard 32. Thus, with a firearm so positioned, and the second signal generated by the signal generating means 58, the plungers 44 and 46 are extended across the width of the holster and are effectively locked in place.

Figure 9:
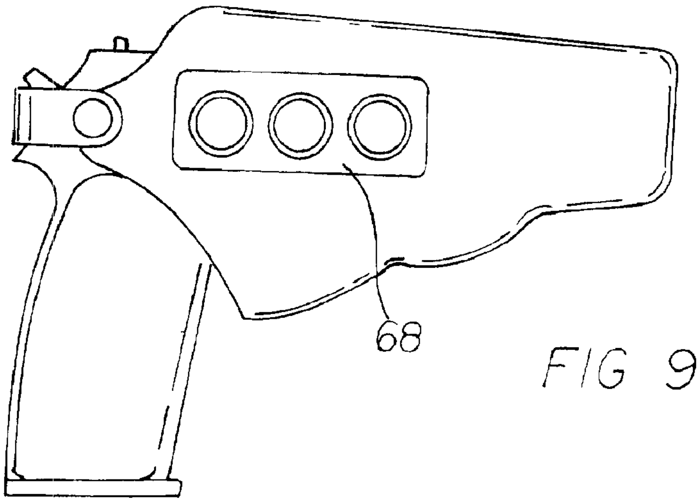
FIG. 9 is an alternative embodiment of the present invention.
Figure 10:
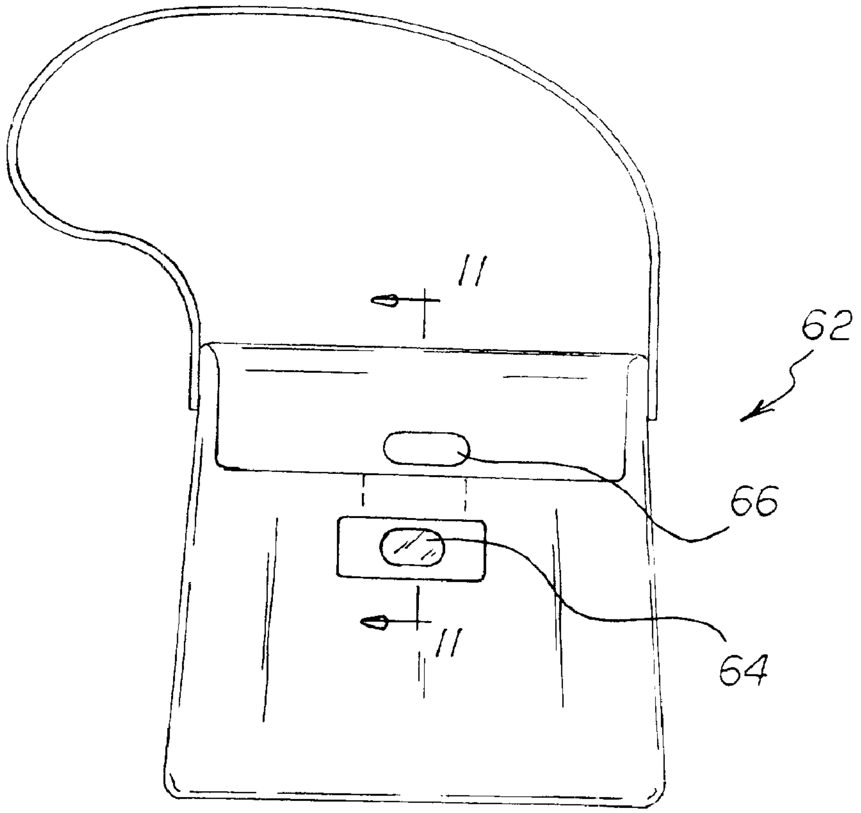
FIG. 10 is a purse shown in an alternative embodiment of the present invention.
Figure 11:
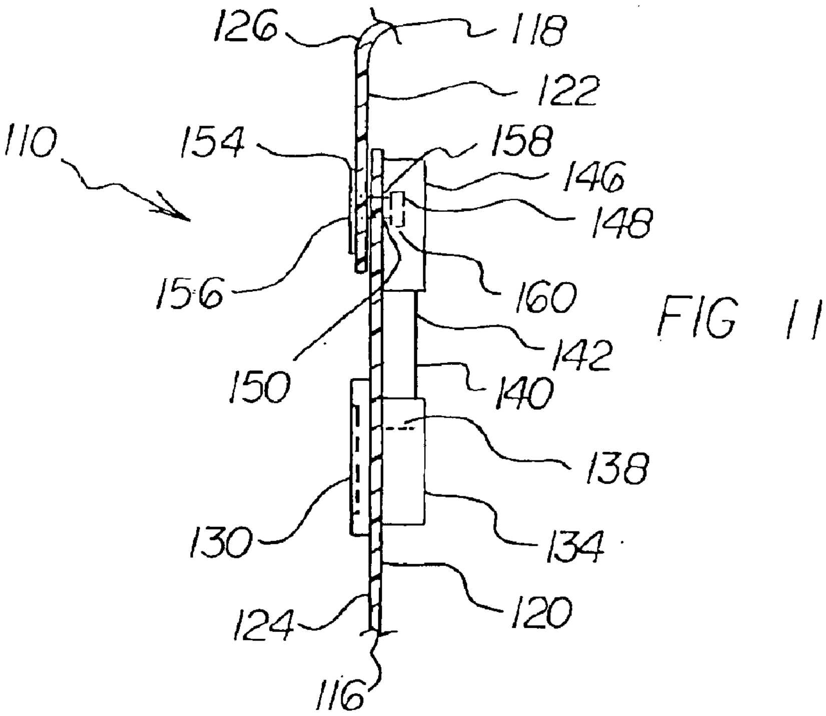
FIG. 11 is a cross-sectional view of the container shown in FIG. 10 illustrating the locking components.

Although the present invention has been described in conjunction with a holster, the general principles can be employed with other devices. Specifically, FIG. 9 illustrates a woman's purse 62 with a fingerprint identification means 64 similar to the one described. Thus, a woman carrying a purse who wishes to gain entry into the interior compartment would place her finger upon the input device. If a match were obtained, electrical power would be supplied to the coupling means 66 to cause their separation. Thereafter, the purse 62 could be opened. Furthermore, the present invention could also be employed with a push button type device 68. Such a push button type device 68 is depicted in FIG. 8. In this embodiment, the fingerprint identification means is replaced by a three-button combination lock. A user wishing to gain access to the firearm would input a predetermined three-digit code. Thereafter the three-digit code would be electrically compared to the three-digit code stored in memory. A match would generate a signal such that plungers would be placed into their second disengaged orientation and the locks would be permitted to be uncoupled.

Additional alternate embodiments are illustrated in FIGS. 10 through 15. With greater specificity to FIGS. 10 and 11, there is shown a purse security system 110 for maintaining a purse locked until the presentation of a fingerprint of an approved user. Such system includes a purse 62 with a first section 116 and a second section 118. The sections are movable between a closed orientation for the secure maintenance of objects there within and an open orientation for adding and removing objects therefrom. Each section has an inside 120, 122 and an outside 124, 126.

A touch pad 130 is next provided for fingerprint identification. Such pad is attached to the outside of the first section and is adapted to removably receive a fingerprint of a user.

Next provided is a sensor 134 with at least one pre-stored fingerprint. The finger print of one or more approved users may be provided to the sensor. Such sensor is on the inside of the first portion. It is operatively coupled to the touch pad and is adapted to generate a signal when a fingerprint of the user on the touch pad matches a pre-stored fingerprint in the sensor.

A solenoid 138 is next provided. The solenoid is located on the inside of the first section. It is operatively coupled to the sensor. The solenoid has a plunger 140 reciprocable from a rest position to a withdrawn position in response to a signal from the sensor so long as a fingerprint of a user is on the touch pad which matches a pre-stored fingerprint in the sensor. The plunger has a remote end 142.

Next provided is a latch 146 on the inside of the first section attached to the remote end of the plunger for reciprocation there with. The latch has a recess 148 therein. The recess faces facing the first section and an aperture 150 in the first section and is aligned with the recess.

Lastly provided is a release assembly 154. Such release assembly is for coupling purposes. It is attached to the second section. The release assembly has an exterior region 156 on the outside of the second section and a finger 158' extending inwardly of the inside of the second section through the aperture. The finger is formed with an enlarged end 160 removably positionable in the recess of the latch. The finger is securely retained within the recess of the latch to maintain the purse locked in the closed orientation when the latch and solenoid are in the rest position. The finger, however, is readily removable from the recess and latch to allow the purse to assume the open orientation when the latch and plunger are reciprocated to the withdrawn position. Such reciprocation to the withdrawn position is in response to a fingerprint of a user on the touch pad matching a pre-stored finger print in the sensor.

Figure 12:
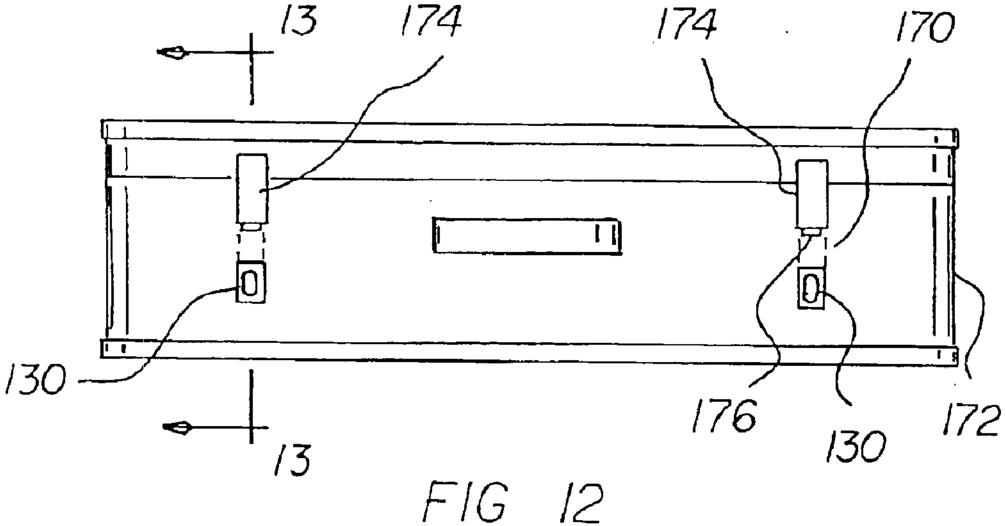
FIG. 12 is a plan view of a suitcase with locking components constructed in accordance with an alternate embodiment of the invention.
Figure 13:
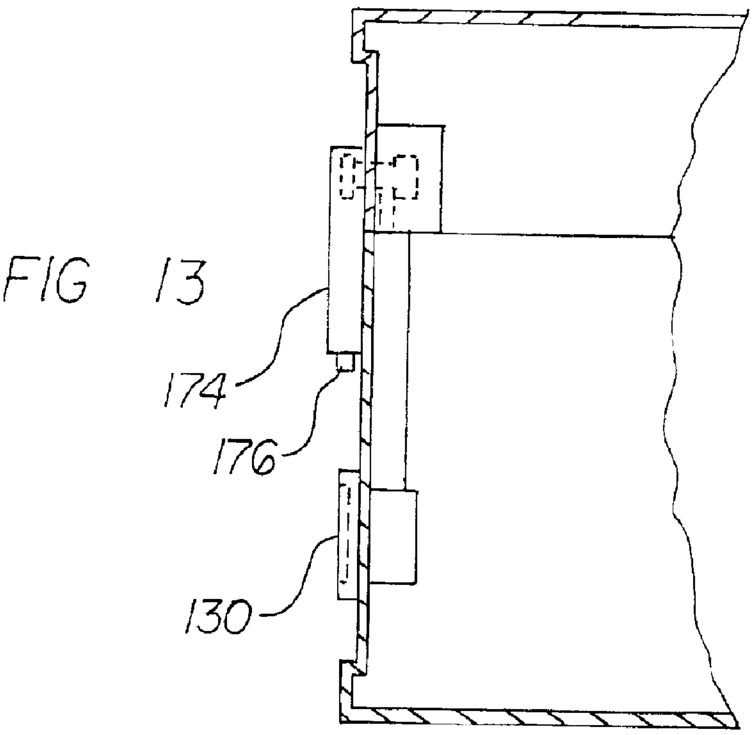
FIG. 13 is a cross-sectional view taken along line 13—13 of FIG. 12.

With reference to FIGS. 12 and 13, the container is shown as suitcase 170. In addition to the components as described above in the embodiment of FIGS. 10 and 11, this embodiment further includes a secondary release assembly 174. The secondary release assembly includes a slider 176 on the outside of the second section. It is operatively coupled to the finger. The release assembly and the secondary release assembly operable concurrently for allowing separation of the finger from the recess and latch when the slider is depressed by a user and when the latch and plunger are reciprocated to the withdrawn position in response to a fingerprint of a user on the touch pad matching a pre-stored finger print in the sensor. Two locking systems of the same construction may be utilized on a single container as shown in FIG. 12.

Figure 14:
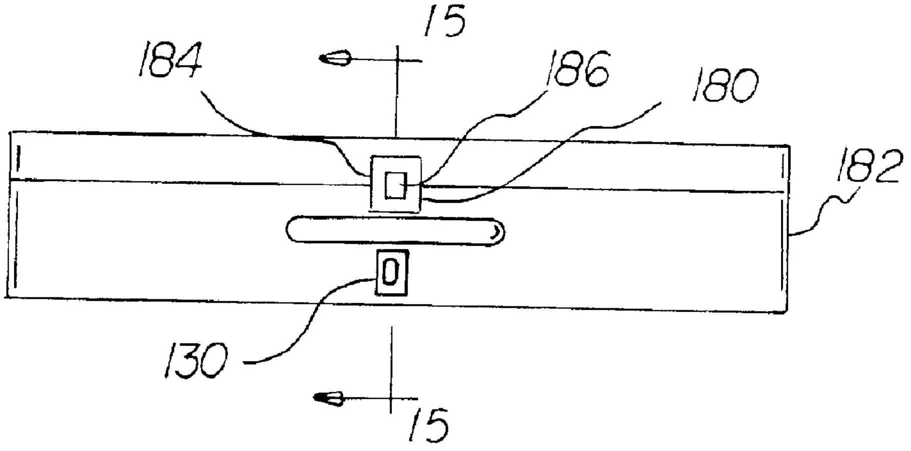
FIG. 14 is a plan view of an attache case with locking components constructed in accordance with another alternate embodiment of the invention.
Figure 15:
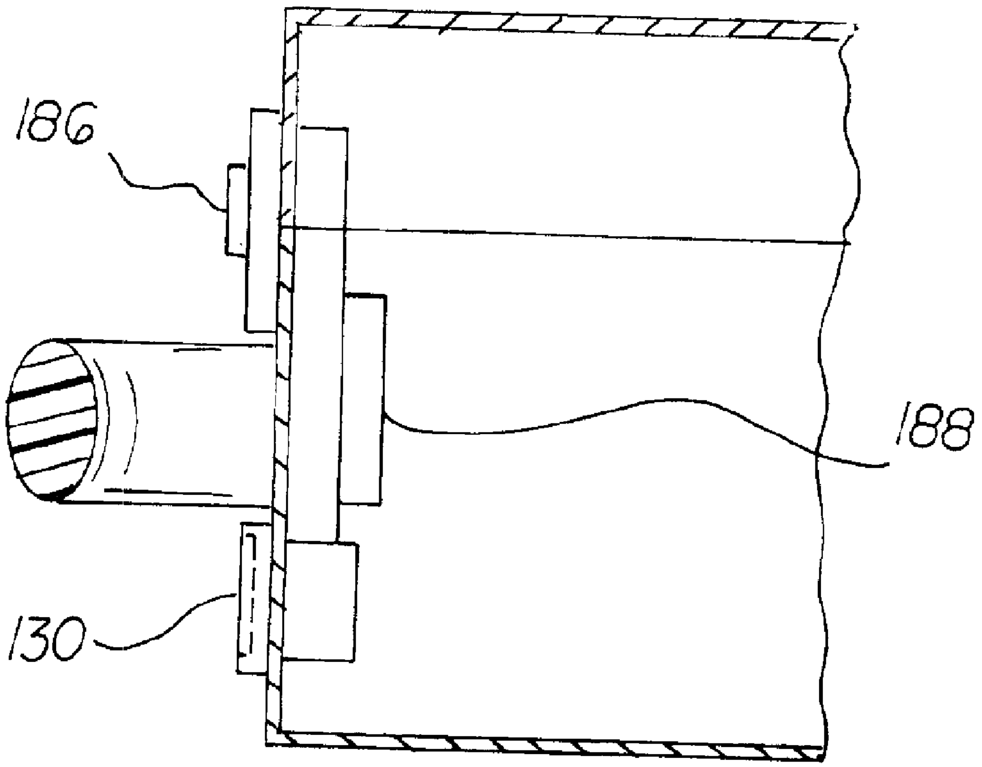
FIG. 15 is a cross-sectional view taken along line 15—15 of FIG. 14.

A final embodiment as illustrated in FIGS. 14 and 15, wherein the container is an attache case 180. In addition to the components set forth above in the description of the embodiment of FIGS. 10 and 11, this embodiment further includes a supplemental release assembly 184. Such supplemental release assembly has a button 186 on the outside of the second section operatively coupled to the finger. The release assembly and the secondary release assembly are operable for allowing separation of the finger from the recess and latch when the button is depressed by a user and when the latch and plunger are reciprocated to the withdrawn position in response to a fingerprint of a user on the touch pad matching a pre-stored finger print in the sensor. In addition, there is also provided a timer 188. The timer is operatively coupled to the solenoid to hold the plunger retracted for a predetermined period of time, as for example 5 seconds, to allow a user to depress the button after the finger print of a user has been removed from the touch pad.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A purse security system for maintaining a purse locked until the presentation of a fingerprint of an approved user comprising, in combination:

a purse with a first section and a second section, the sections movable between a closed orientation for the secure maintenance of objects there within and an open orientation for adding and removing objects therefrom, each section having an inside and an outside;

a touch pad for fingerprint identification attached to the outside of the first section adapted to removably receive a fingerprint of a user;

a sensor with at least one pre-stored fingerprint on the inside of the first portion operatively coupled to the touch pad and adapted to generate a signal when a fingerprint of the user on the touch pad matches a pre-stored fingerprint in the sensor;

a solenoid on the inside of the first section operatively coupled to the sensor, the solenoid having a plunger reciprocable from a rest position to a withdrawn position in response to a signal from the sensor so long as a fingerprint of a user is on the touch pad which matches a pre-stored fingerprint in the sensor, the plunger having a remote end; and a latch on the inside of the first section attached to the remote end of the plunger for reciprocation there with, the latch having a recess therein facing the first section and an aperture in the first section aligned with the recess;

a release assembly for coupling purposes attached to the second section, the release assembly having an exterior region on the outside of the second section and a finger extending inwardly of the inside of the second section through the aperture with an enlarged end removably positionable in the recess of the latch, the finger being securely retained within the recess of the latch to maintain the purse locked in the closed orientation when the latch and solenoid are in the rest position but with the finger being readily removable from the recess and latch to allow the purse to assume the open orientation when the latch and plunger are reciprocated to the withdrawn position in response to a fingerprint of a user on the touch pad matching a pre-stored fingerprint in the sensor.

2. A suitcase security system for maintaining a suitcase locked until the presentation of a fingerprint of an approved user comprising, in combination:

a suitcase with a first section and a second section, the sections movable between a closed orientation for the secure maintenance of objects there within and an open orientation for adding and removing objects therefrom, each section having an inside and an outside;

a touch pad for fingerprint identification attached to the outside of the first section adapted to removably receive a fingerprint of a user;

a sensor with at least one pre-stored fingerprint on the inside of the first portion operatively coupled to the touch pad and adapted to generate a signal when a fingerprint of the user on the touch pad matches a pre-stored fingerprint in the sensor;

a solenoid on the inside of the first section operatively coupled to the sensor, the solenoid having a plunger reciprocable from a rest position to a withdrawn position in response to a signal from the sensor so long as a fingerprint of a user is on the touch pad which matches a pre-stored fingerprint in the sensor, the plunger having a remote end;

a latch on the inside of the first section attached to the remote end of the plunger for reciprocation there with, the latch having a recess therein facing the first section and an aperture in the first section aligned with the recess;

a release assembly for coupling purposes attached to the second section, the release assembly having an exterior region on the outside of the second section and a finger extending inwardly of the inside of the second section through the aperture with an enlarged end removably positionable in the recess of the latch; and a secondary release assembly including a slider on the outside of the second section operatively coupled to the finger, the release assembly and the secondary release assembly operable concurrently for allowing separation of the finger from the recess and latch when the slider is depressed by a user and when the latch and plunger are reciprocated to the withdrawn position in response to a fingerprint of a user on the touch pad matching a pre-stored fingerprint in the sensor.

3. An attache case security system for maintaining an attache case locked until the presentation of a fingerprint of an approved user comprising, in combination:

an attache case with a first section and a second section, the sections movable between a closed orientation for the secure maintenance of objects there within and an open orientation for adding and removing objects therefrom, each section having an inside and an outside;

a touch pad for fingerprint identification attached to the outside of the first section adapted to removably receive a fingerprint of a user;

a sensor with at least one pre-stored fingerprint on the inside of the first portion operatively coupled to the touch pad and adapted to generate a signal when a fingerprint of the user on the touch pad matches a pre-stored fingerprint in the sensor;

a solenoid on the inside of the first section operatively coupled to the sensor, the solenoid having a plunger reciprocable from a rest position to a withdrawn position in response to a signal from the sensor so long as a fingerprint of a user is on the touch pad which matches a pre-stored fingerprint in the sensor, the plunger having a remote end;

a latch on the inside of the first section attached to the remote end of the plunger for reciprocation there with, the latch having a recess therein facing the first section and an aperture in the first section aligned with the recess;

a release assembly for coupling purposes attached to the second section, the release assembly having an exterior region on the outside of the second section and a finger extending inwardly of the inside of the second section through the aperture with an enlarged end removably positionable in the recess of the latch;

a supplemental release assembly including a button on the outside of the second section operatively coupled to the finger, the release assembly and the secondary release assembly operable for allowing separation of the finger from the recess and latch when the button is depressed by a user and when the latch and plunger are reciprocated to the withdrawn position in response to a fingerprint of a user on the touch pad matching a pre-stored fingerprint in the sensor; and a timer operatively coupled to the solenoid to hold the plunger retracted for a predetermined period of time to allow a user to depress the button after a matching fingerprint of a user has been removed from the touch pad.

4. A container security system comprising:

a container with a first section and a second section;

a touch pad for fingerprint identification attached to the outside of the first section;

a sensor with at least one pre-stored fingerprint operatively coupled to the touch pad;

a solenoid coupled to the sensor and having a plunger reciprocable from a rest position to a withdrawn position in response to a signal from the sensor;

a latch attached to the remote end of the plunger having a recess therein;

a primary release assembly coupled to the second section with a finger removably positionable in the recess to maintain the container locked in a closed orientation but with the finger being readily removable from the recess to allow the container security system to assume an open orientation when the latch and plunger are reciprocated in response to a fingerprint of a user on the touch pad matching a pre-stored fingerprint in the sensors;

additional release assembly operable to allow the operation of the primary release assembly.

5. The system as set forth in claim 4 wherein the container is a purse.

6. The system as set forth in claim 4 wherein the container is a suitcase.

7. The system as set forth in claim 4 wherein the container is an attache case.

8. The system as set forth in claim 4 wherein the additional release assembly is a secondary release assembly including a slider on the outside of the second section operatively coupled to the finger, the primary release assembly and the secondary release assembly operable concurrently for allowing separation of the finger from the recess and latch when the slider is depressed by a user and when the latch and plunger are reciprocated to the withdrawn position in response to a fingerprint of a user on the touch pad matching a pre-stored fingerprint in the sensor.

9. The system as set forth in claim 4 wherein the additional release assembly is a supplemental release assembly including a button on the outside of the second section operatively coupled to the finger, the primary release assembly and the secondary release assembly operable for allowing separation of the finger from the recess and latch when the button is depressed by a user and when the latch and plunger are reciprocated to the withdrawn position in response to a fingerprint of a user on the touch pad matching a pre-stored fingerprint in the sensor; and a timer 188 operatively coupled to the solenoid to hold the plunger retracted for a predetermined period of time to allow a user to depress the button after a matching fingerprint of a user has been removed from the touch pad.

* * * * *